United States Patent
Shinozaki et al.

(10) Patent No.: US 6,830,594 B2
(45) Date of Patent: Dec. 14, 2004

(54) PROCESS FOR PRODUCING AN ELECTRIC DOUBLE LAYER CAPACITOR AND POSITIVE ELECTRODE FOR AN ELECTRIC DOUBLE LAYER CAPACITOR

(75) Inventors: Yasuo Shinozaki, Kanagawa (JP); Naoki Yoshida, Kanagawa (JP); Kazuya Hiratsuka, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/226,135

(22) Filed: Aug. 23, 2002

(65) Prior Publication Data

US 2003/0048594 A1 Mar. 13, 2003

(30) Foreign Application Priority Data

Aug. 23, 2001 (JP) ........................................ 2001-253267

(51) Int. Cl.[7] ............................ H01G 9/00; H01G 9/145
(52) U.S. Cl. ...................... 29/25.03; 361/502; 361/508
(58) Field of Search ...................... 361/508, 502–505, 361/512; 29/25.03; 427/79, 80

(56) References Cited

U.S. PATENT DOCUMENTS

| 4,542,444 | A | * | 9/1985 | Boland |
| 4,683,516 | A | * | 7/1987 | Miller .......................... 361/328 |
| 5,340,670 | A | * | 8/1994 | Takami et al. |
| 6,195,251 | B1 | * | 2/2001 | Suhara et al. |
| 6,424,517 | B1 | | 7/2002 | Ikeda et al. |

FOREIGN PATENT DOCUMENTS

| JP | 1-304719 | 12/1989 |
| JP | 9-45586 | 2/1997 |

OTHER PUBLICATIONS

Patent Abstracts of Japan, JP 3–085711, Apr. 10, 1991.

* cited by examiner

*Primary Examiner*—Ha Tran Nguyen
(74) *Attorney, Agent, or Firm*—Oblon, Spivak, McClelland, Maier & Neustadt, P.C.

(57) ABSTRACT

A process for producing an electric double layer capacitor, which comprises a step of preparing a positive electrode and a negative electrode, each being a carbonaceous electrode containing as the main component a carbon material having a specific surface area of from 100 to 2,500 m$^2$/g, a step of forming an element comprising the positive electrode and the negative electrode and a separator having a thickness of at most 60 μm interposed therebetween, and a step of impregnating the element with a non-aqueous electrolyte, wherein the copper content in the positive electrode before being impregnated with the non-aqueous electrolyte is at most 1 ppm.

19 Claims, No Drawings

PROCESS FOR PRODUCING AN ELECTRIC DOUBLE LAYER CAPACITOR AND POSITIVE ELECTRODE FOR AN ELECTRIC DOUBLE LAYER CAPACITOR

The present invention relates to a process for producing a non-aqueous electric double layer capacitor which has a low internal resistance, which has a high power output and a high energy density, and which is excellent in discharge properties, and a positive electrode for an electric double layer capacitor.

Heretofore, as a separator interposed between a positive electrode and a negative electrode of an electric double layer capacitor, a sheet obtained from e.g. fine fibers obtained by beating regenerated cellulose, craft pulp, sisal hemp or manila hemp, glass fibers or polyphenylenesulfide fibers by themselves or as mixed, a stretched microporous film made of polyolefin or PTFE, a polyethylene nonwoven fabric, a polypropylene nonwoven fabric and a polyester nonwoven fabric are known (JP-A-9-45586, JP-A-1-304719).

The role of a separator is to electrically insulate a positive electrode from a negative electrode on one hand and to facilitate transfer of ions in an electrolyte, which takes place accompanying charge and discharge, i.e. ion conduction on the other hand. Particularly for a high power output and large capacitance electric double layer capacitor for large current charge and discharge, decrease in the resistance and increase in the capacitance per unit volume i.e. the storage energy amount per unit volume (hereinafter referred to as energy density) have been desired, and it is accordingly required to make the separator as thin as possible. For such a high power output electric double layer capacitor, a separator having a thickness of from 50 to 150 $\mu$m has usually been used.

However, if the thickness of the separator is made to be less than 60 $\mu$m for the purpose of achieving a low resistance and an increase of the energy density, the insulating property between the positive and negative electrodes tends to be inadequate, thus leading to micro-short circuiting, which causes frequent self-discharge failure. Many of these problems are caused by the presence of pinholes generated on the separator by making the layer thin, and by electrically conductive coarse particles of e.g. activated carbon present on the surface of the electrodes. However, even in an electric double layer capacitor produced under conditions under which they are removed, if a thin layer separator of at most 60 $\mu$m is used, self-discharge failure still takes place in many cases. Accordingly, with a conventional electric double layer capacitor, the decrease in the resistance and the increase in the capacitance density by making the separator thin have been limited.

Accordingly, the present invention has been made to overcome the above problems, and it is an object of the present invention to provide a process for producing a high power output electric double layer capacitor, which has a low internal resistance, a high power output and a high energy density, and which has a low ratio of self-discharge failure, and a positive electrode for an electric double layer capacitor.

The present inventors have conducted extensive studies on the generation of the above-described self-discharge failure, and as a result, we have found such a phenomenon that metal impurities particularly copper present in the positive electrode which is polarized to a positive potential, electrochemically or partially chemically elute in the electrolyte in a voltage-applied state, and the copper ions are transferred to the negative electrode side and electrochemically reduced, and deposited on the surface of the negative electrode as metal copper. The present inventors have further found that when the metal copper grows and penetrates through the separator, micro-short circuiting takes place between the electrodes, which causes self-discharge failure.

Accordingly, the present invention is to provide a process for producing an electric double layer capacitor employing a thin layer separator, wherein the copper content in the positive electrode is decreased, to provide an electric double layer capacitor with which frequency of the self-discharge failure is low.

Specifically, the present invention provides a process for producing an electric double layer capacitor, which comprises a step of preparing a positive electrode and a negative electrode, each being a carbonaceous electrode containing as the main component a carbon material having a specific surface area of from 100 to 2,500 m$^2$/g, a step of forming an element comprising the positive electrode and the negative electrode and a separator having a thickness of at most 60 $\mu$m interposed therebetween, and a step of impregnating the element with a non-aqueous electrolyte, wherein the copper content in the positive electrode before being impregnated with the non-aqueous electrolyte is at most 1 ppm.

Even when the thickness of the separator is at most 60 $\mu$m, more preferably at most 50 $\mu$m, by making the copper content in the positive electrode at most 1 ppm, micro-short circuiting due to deposition of metal copper can be suppressed, and at the same time, by making the separator thin, an electric double layer capacitor having a low internal resistance and a high energy density can be provided. It is more preferred that the thickness of the separator is at most 30 $\mu$m and the copper content is at most 0.5 ppm.

The present invention further provides a positive electrode for an electric double layer capacitor, which is a carbonaceous electrode containing as the main component a carbon material having a specific surface area of from 100 to 2,500 m$^2$/g, wherein the copper content is at most 1 ppm.

In the electric double layer capacitors produced by the process of the present invention, both the positive electrode and the negative electrode are carbonaceous electrodes containing as the main component a carbon material having a specific surface area of from 100 to 2,500 m$^2$/g. These capacitors work on the basis of a principle that electric charge is stored in an electric double layer formed at the interface between the electrodes and an electrolyte, or electric charge is stored in a pseudo electric double layer involving an electrochemical reaction. The carbon material preferably has a high specific surface area to increase the energy density per cell volume.

In the process of the present invention, first, a positive electrode and a negative electrode, each of which is a carbonaceous electrode containing as the main component a carbon material having a specific surface area of from 100 to 2,500 m$^2$/g, are prepared. As the carbon material, activated carbon derived from natural plant tissue such as coconut shell, activated carbon derived from a synthetic resin such as a phenolic resin, activated carbon derived from fossil fuel such as coal, coke or pitch, carbon black, polyacene or a carbonaceous material in which graphite structure is developed, may, for example, be used.

The activated carbon is subjected to various activation treatment in order to increase the specific surface area and to increase adsorption properties. The activation method of the carbon material to obtain activated carbon varies depending upon the material to be used, but usually steam activation or alkali activation, particularly activation by KOH is applied. Activated carbon derived from natural plant tissue or fossil fuel contains a relatively large amount of metal impurities, and accordingly washing with e.g. an acid is usually required. Similarly, alkali activated carbon contains a large amount of alkali metals used for the activation or metal impurities brought from an activation apparatus due to the reaction with the alkali, and accordingly washing with e.g. an acid is required. Steam activated carbon made of a synthetic resin as a raw material, is most preferred since it contains a small amount of metal impurities, whereby the above-described washing is not required.

The carbonaceous electrode is prepared preferably in such a manner that a mixture comprising the carbon material having a high specific surface area which has a role of electric storage, a small amount of a binder and as the case requires, an electrically conductive aid, is formed into a thin layer to form a sheet, and the sheet is bonded to a metal current collector. As the metal current collector, a foil or a mesh of e.g. aluminum or stainless steel may, for example, be used. Aluminum is particularly preferred since it has a light weight and a low electric resistance. As the binder used as a shape-imparting material, e.g. polyvinylidene fluoride, polytetrafluoroethylene, a polyimide resin or a polyamide-imide resin is preferred. Further, e.g. carbon black, carbon fiber or fine graphite powder is preferably used as the electrically conductive aid, whereby a high conductive carbonaceous electrode can be obtained.

The positive electrode for an electric double layer capacitor of the present invention is a carbonaceous electrode containing as the main component a carbon material having a specific surface area of from 100 to 2,500 $m^2/g$, and is characterized in that the copper content is at most 1 ppm. Copper is preliminarily mixed as an impurity in the component material of the electrodes e.g. the carbon material or the binder in many cases, but it may be mixed in e.g. the following cell assembling step in some cases. In the present invention, the copper content in the positive electrode in a state before the element comprising the positive electrode and the negative electrode, each containing a carbon material as the main component, and a separator having a thickness of at most 60 $\mu$m interposed therebetween, is impregnated with a non-aqueous electrolyte, is defined. In the present invention, the copper content in the positive electrode means the copper content in the electrode material bonded on the metal current collector.

The carbonaceous electrode contains the above-described carbon material having a high specific surface area as the main component, and preferably contains the binder as the shape-imparting material and the electrically conductive aid in amounts of from 3 to 15 mass % and from 5 to 20 mass %, respectively, based on the total amount of the carbon material, the binder and the electrically conductive aid. Accordingly, the copper content in the positive electrode is influenced by the copper content in the carbon material as the main component most. Particularly when activated carbon derived from natural plant tissue or fossil fuel is used as the carbon material, since it has a relatively high copper content, it is preferred to adequately carry out washing with an acid after the activation treatment to preliminarily remove copper.

Further, in the step of activation treatment of activated carbon, copper may be mixed from e.g. the material of an inner wall of an activation apparatus in some cases. Accordingly, also in a case where alkali activated carbon made of e.g. pitch or coke as the raw material, is used for the positive electrode material, it is required to adequately carry out washing with an acid after activation also with a purpose of removing the alkali component. As the acid for washing used, usually, a mineral acid such as sulfuric acid, nitric acid or hydrochloric acid; or an organic acid such as acetic acid or oxalic acid may be mentioned. However, if such an acid component remains in the activated carbon, e.g. cycle reliability of the capacitor may be impaired, and accordingly it is preferred to adequately remove such a remaining acid component usually by washing with water.

It is preferred to use the carbon material as an electrode material after drying by heating and then optionally carrying out particle size adjustment by grinding. At this stage in which the carbon material is used as the electrode material, the copper content in the carbon material for the positive electrode is preferably at most 1 ppm, more preferably at most 0.5 ppm, furthermore preferably at most 0.3 ppm.

Further, in a case where the binder and the electrically conductive aid are added to the carbon material to constitute the carbonaceous electrode, a binder and an electrically conductive aid, each having a high purity, are optionally selected so that the copper content in the entire positive electrode will be at most 1 ppm depending upon their addition amounts. As the binder, e.g. a fluororesin or an imide resin is preferably used in view of electrochemical resistance, solvent resistance and heat resistance. Particularly, one having a copper content of at most 0.05 ppm is preferred. As the electrically conductive aid, carbon black having a copper content of at most 1 ppm is suitable.

For formation of the electrode, a method wherein polytetrafluoroethylene as the binder is added to the carbon material and kneaded, followed by rolling or stretching to form a fibrillated sheet, which is bonded to a current collector, or a method wherein a solvent-soluble type polyvinylidene fluoride or an imide resin as the binder is added to the carbon material to prepare a solvent dispersed slurry, which is coated on a current collector, may, for example, be employed preferably. In either method, it is preferred to decrease mixing of copper derived from the material used, and to control e.g. an apparatus used for e.g. an electrode preparation step and operation environment as well to avoid mixing of copper in steps before impregnation with a non-aqueous electrolyte as far as possible.

Further, if the electrode contains moisture adsorbed from the environmental atmosphere, the performance of the capacitor employing a non-aqueous electrolyte is significantly deteriorated, and accordingly it is preferred to remove moisture in the electrolyte before impregnation with a non-aqueous electrolyte as far as possible. As the method of removing moisture, drying by heating in the air, drying by heating in an inert gas such as nitrogen or argon, or drying by heating under reduced pressure may be mentioned. In the drying step also, it is preferred to control the apparatus and environment so as to avoid mixing of copper.

Then, between the positive electrode and the negative electrode, each being a carbonaceous electrode prepared by the above-described method, a separator having a thickness of at most 60 $\mu$m is interposed to form an element. The material of the separator is not particularly limited, and a sheet made of e.g. microfibers obtained by beating regenerated cellulose, craft pulp, sisal hemp or manila hemp, glass fibers or polyphenylenesulfide fibers by themselves or as mixed, a stretched microporous film made of polyolefin or PTFE, or a nonwoven fabric such as a polyethylene nonwoven fabric, a polypropylene nonwoven fabric or a polyester nonwoven fabric, may, for example, be used suitably. The higher the porosity of the separator, the better, in view of electrolyte-absorbing property, electrolyte-holding property and the internal resistance, however, the higher the porosity, the more drawbacks such as pinholes increase, thus leading to self-discharge failure. Accordingly, the porosity is usually preferably from 50 to 90%, more preferably from 60 to 85%.

The electrolyte to be used for an electric double layer capacitor includes an aqueous electrolyte and a non-aqueous electrolyte. However, the storage energy of the capacitor is proportional to the square of the operation voltage, and accordingly it is advantageous to use a non-aqueous electrolyte having a higher decomposition voltage i.e. operation voltage in view of the energy density, and in the present invention, a non-aqueous electrolyte is used.

As the non-aqueous electrolyte of the present invention, it is preferred to use a non-aqueous electrolyte comprising the following solute and solvent, however, an ionic liquid (ordinary temperature molten salt) which does not contain the following solvent, such as an imidazolinium salt, may, for example, also be used. In the non-aqueous electrolyte of the present invention, amounts of metal impurities and moisture are preferably small, and usually a non-aqueous electrolyte having a copper content of at most 0.01 ppm and a moisture content of at most 10 ppm is preferably used.

The solute for the non-aqueous electrolyte is preferably one type or a mixture of at least two types of salts comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion such as $BF_4^-$, $PF_6^-$, $CF_3SO_3^-$, $AsF_6^-$, $N(SO_2CF_3)_2^-$ or $ClO_4^-$. Particularly, it is preferred to use a non-aqueous electrolyte containing $(C_2H_5)_3(CH_3)NBF_4$ as a solute in view of electrical conductivity.

Further, the organic solvent to be used for the non-aqueous electrolyte is preferably a cyclic carbonate such as ethylene carbonate, propylene carbonate or butylene carbonate, a linear carbonate such as dimethyl carbonate, ethyl methyl carbonate or diethyl carbonate, sulfolane or a sulfolane derivative, or a nitrile such as acetonitrile or glutaronitrile. At least one member selected from the group consisting of propylene carbonate, ethylene carbonate, dimethyl carbonate, diethyl carbonate, methyl ethyl carbonate, sulfolane and methyl sulfolane, is particularly preferred.

Now, the present invention will be explained in further detail with reference to Examples of the present invention (Examples 1 to 8) and Comparative Examples (Examples 9 to 16). However, it should be understood that the present invention is by no means restricted to such specific Examples.

EXAMPLES 1 TO 16

Steam activated carbon made of a phenol resin as a raw material (specific surface area: 2,000 m$^2$/g), steam activated carbon made of coconut shell as a raw material (specific surface area: 1,700 m$^2$/g) or KOH activated carbon made of petroleum coke as a raw material (specific surface area: 2,000 m$^2$/g) was washed with hydrochloric acid and washed with deionized water, and then remaining hydrochloric acid was removed from the activated carbon by drying under reduced pressure to obtain activated carbon for an electrode.

The material for the activated carbon and the copper content in each of Examples 1 to 16 are shown in Table 1.

80 Mass % of the activated carbon powder for an electrode, 10 mass % of acetylene black as an electrically conductive aid and 10 mass % of polytetrafluoroethylene as a binder were kneaded together with ethyl alcohol, and then rolled into a sheet, which was dried by heating to evaporate ethyl alcohol to prepare an activated carbon sheet having a thickness of 200 μm. Then, the obtained activated carbon sheet was bonded to each side of a current collector having a thickness of 50 μm and made of aluminum (purity: 99.99%) by means of a carbon electrically conductive adhesive, followed by drying under vacuum at 200° C. for 24 hours to obtain a long electrode. Using a pair of thus obtained electrodes as a positive electrode and a negative electrode, each of different types of separators having different thicknesses was interposed therebetween, and the assembly was wound to prepare a cylindrical element. The thickness and the type of the separator used in each of Examples 1 to 16 are shown in Table 1.

Before impregnation with a non-aqueous electrolyte, the obtained cylindrical element was dismantled, the activated carbon sheet on the positive electrode side was peeled off, and 0.2 g thereof was collected and immersed in a 30% nitric acid aqueous solution heated to 70° C. for 12 hours, a solid content was collected by filtration, and the copper content in the filtrate was quantified by ICP emission spectrometry to obtain the copper content in the positive electrode. The copper content measured with respect to each of the positive electrodes of Examples 1 to 16 is shown in Table 1.

Then, the obtained cylindrical element was impregnated with an electrolyte obtained by dissolving 1.5 mol/l $(C_2H_5)_3(CH_3)NBF_4$ in propylene carbonate, followed by dehydration, under reduced pressure, and then sealed with a cylindrical cell housing component, to obtain a cylindrical electric double layer capacitor cell having a diameter of 45 mm and a length of 150 mm.

Using the obtained cylindrical electric double layer capacitor cell, constant voltage charging was carried out at 2.5 V for 30 minutes, and then discharging was carried out at a constant current of 30 A to a level of 1.0 V, whereby the cell capacitance was obtained from the slope of the discharge curve from 2.5 V to 1.0 V. Further, from the voltage drop at the initial stage of discharging, the internal resistance was calculated. Further, after constant voltage charging at 2.5 V for 12 hours, the cell was left to stand in an open circuit state, and the voltage retention after 72 hours was measured. A cell having a retention voltage after 72 hours of at least 2.25 V, i.e. a Coulomb retention ratio of at least 90%, was charged as a self-discharge acceptable product, and the incidence of self-discharge failure was measured by using 50 cells in each of Examples 1 to 16. The self capacitance, the cell internal resistance and the number of self-discharge failure measured with respect to each of Examples 1 to 16 are shown in Table 1.

TABLE 1

| | Activated carbon | | Positive electrode | Separator | | Cell | | |
|---|---|---|---|---|---|---|---|---|
| Example | Raw material | Copper content (ppm) | Copper content (ppm) | Type | Thickness (μm) | Capacitance (F) | Internal resistance (mΩ) | Number of self-discharge failure |
| Ex. 1 | Phenol resin | 0.25 | 0.3 | Regenerated cellulose paper | 30 | 2310 | 2.3 | 0 |

TABLE 1-continued

| Example | Activated carbon Raw material | Copper content (ppm) | Positive electrode Copper content (ppm) | Separator Type | Thickness (μm) | Cell Capacitance (F) | Internal resistance (mΩ) | Number of self-discharge failure |
|---|---|---|---|---|---|---|---|---|
| Ex. 2 | Phenol resin | 0.25 | 0.3 | PP microporous film | 25 | 2360 | 2.4 | 0 |
| Ex. 3 | Phenol resin | 0.48 | 0.5 | Regenerated cellulose paper | 50 | 2220 | 2.6 | 0 |
| Ex. 4 | Phenol resin | 0.7 | 0.8 | Regenerated cellulose paper | 30 | 2300 | 2.3 | 0 |
| Ex. 5 | Coconut shell | 0.85 | 0.9 | Regenerated cellulose paper | 30 | 2080 | 2.5 | 0 |
| Ex. 6 | Coconut shell | 0.85 | 0.9 | Regenerated cellulose paper | 50 | 1940 | 2.6 | 0 |
| Ex. 7 | Petroleum coke | 0.93 | 1 | Regenerated cellulose paper | 30 | 2540 | 2.3 | 0 |
| Ex. 8 | Petroleum coke | 0.93 | 1 | Regenerated cellulose paper | 50 | 2450 | 2.5 | 0 |
| Comparative Ex. 9 | Phenol resin | 0.45 | 0.5 | Regenerated cellulose paper | 85 | 1980 | 2.9 | 0 |
| Comparative Ex. 10 | Phenol resin | 1.4 | 1.5 | Regenerated cellulose paper | 50 | 2300 | 2.6 | 5 |
| Comparative Ex. 11 | Coconut shell | 0.85 | 0.9 | Regenerated cellulose paper | 85 | 1780 | 3.1 | 0 |
| Comparative Ex. 12 | Coconut shell | 1.6 | 1.7 | Regenerated cellulose paper | 50 | 1920 | 2.8 | 7 |
| Comparative Ex. 13 | Coconut shell | 1.6 | 1.7 | PET nonwoven fabric | 120 | 1610 | 3.1 | 2 |
| Comparative Ex. 14 | Petroleum coke | 2.1 | 2.2 | Regenerated cellulose paper | 50 | 2410 | 2.6 | 9 |
| Comparative Ex. 15 | Petroleum coke | 4.7 | 4.9 | Regenerated cellulose paper | 50 | 2400 | 2.6 | 11 |
| Comparative Ex. 16 | Petroleum coke | 4.7 | 4.9 | PET nonwoven fabric | 120 | 2010 | 3.2 | 4 |

According to the present invention, a process for producing an electric double layer capacitor which has a low internal resistance, with which the incidence of self-discharge failure is low, which is excellent in voltage retention property, and which has a high energy density, and a positive electrode for an electric double layer capacitor, can be provided.

The entire disclosure of Japanese Patent Application No. 2001-253267 filed on Aug. 23, 2001 including specification, claims and summary are incorporated herein by reference in its entirety.

What is claimed is:

1. A process for producing an electric double layer capacitor, which comprises a step of preparing a positive electrode and a negative electrode, each being a carbonaceous electrode containing as the main component a carbon material having a specific surface area of from 100 to 2,500 m$^2$/g, a step of forming an element comprising the positive electrode and the negative electrode and a separator having a thickness of at most 60 μm interposed therebetween, and a step of impregnating the element with a non-aqueous electrolyte, wherein the copper content in the positive electrode before being impregnated with the non-aqueous electrolyte is at most 1 ppm.

2. The process for producing an electric double layer capacitor according to claim 1, wherein the copper content in the carbon material is at most 1 ppm.

3. The process for producing an electric double layer capacitor according to claim 2, wherein a mixture of the carbon material, a binder and an electrically conductive aid is formed into a sheet, and the sheet is bonded to a metal current collector to prepare the carbonaceous electrode.

4. The process for producing an electric double layer capacitor according to claim 3, wherein the porosity of the separator is from 50 to 90%.

5. The process for producing an electric double layer capacitor according to claim 2, wherein the porosity of the separator is from 50 to 90%.

6. The process for producing an electric double layer capacitor according to claim 1, wherein a mixture of the carbon material, a binder and an electrically conductive aid is formed into a sheet, and the sheet is bonded to a metal current collector to prepare the carbonaceous electrode.

7. The process for producing an electric double layer capacitor according to claim 6, wherein the porosity of the separator is from 50 to 90%.

8. The process for producing an electric double layer capacitor according to claim 7, wherein the non-aqueous electrolyte contains as a solute a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and at least one anion selected from the group consisting of $BF_4^-$, $PF_6^-$, $CF_3SO_3^-$, $AsF_6^-$, $N(SO_2CF_3)_2^-$ and $ClO_4^-$.

9. The process for producing an electric double layer capacitor according to claim 6, wherein the non-aqueous electrolyte contains as a solute a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and at least one anion selected from the group consisting of $BF_4^-$, $PF_6^-$, $CF_3SO_3^-$, $AsF_6^-$, $N(SO_2CF_3)_2^-$ and $ClO_4^-$.

10. The process for producing an electric double layer capacitor according to claim 1, wherein the porosity of the separator is from 50 to 90%.

11. The process for producing an electric double layer capacitor according to claim 10, wherein the non-aqueous electrolyte contains as a solute a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and at least one anion selected from the group consisting of $BF_4^-$, $PF_6^-$, $CF_3SO_3^-$, $AsF_6^-$, $N(SO_2CF_3)_2^-$ and $ClO_4^-$.

12. The process for producing an electric double layer capacitor according to claim 1, wherein the thickness of the separator is at most 50 μm.

13. The process for producing an electric double layer capacitor according to claim 1, wherein the non-aqueous electrolyte contains as a solute a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and at least one anion selected from the group consisting of $BF_4^-$, $PF_6^-$, $CF_3SO_3^-$, $AsF_6^-$, $N(SO_2CF_3)_2^-$ and $ClO_4^-$.

14. A positive electrode for an electric double layer capacitor, which is a carbonaceous electrode containing as the main component a carbon material having a specific surface area of from 100 to 2,500 $m^2/g$, wherein the copper content is at most 1 ppm.

15. The positive electrode for an electric double layer capacitor according to claim 14, wherein the copper content in the carbon material is at most 1 ppm.

16. The positive electrode for an electric double layer capacitor according to claim 15, which comprises a metal current collector and a sheet containing the carbon material, a binder and an electrically conductive aid bonded to the current collector.

17. The positive electrode for an electric double layer capacitor according to claim 16, wherein carbon black is contained as the electrically conductive aid.

18. The positive electrode for an electric double layer capacitor according to claim 14, which comprises a metal current collector and a sheet containing the carbon material, a binder and an electrically conductive aid bonded to the current collector.

19. The positive electrode for an electric double layer capacitor according to claim 18, wherein carbon black is contained as the electrically conductive aid.

* * * * *